United States Patent [19]
Kelsic

[11] Patent Number: 5,853,513
[45] Date of Patent: Dec. 29, 1998

[54] METHOD OF PRODUCING A STATOR FOR A DISK DRIVE MOTOR

[75] Inventor: Gary F. Kelsic, Longmont, Colo.

[73] Assignee: Mobile Storage Technology Inc., Boulder, Colo.

[21] Appl. No.: 636,096

[22] Filed: Apr. 22, 1996

Related U.S. Application Data

[62] Division of Ser. No. 392,452, Feb. 22, 1995, abandoned.

[51] Int. Cl.⁶ .................................................. C04B 37/00
[52] U.S. Cl. ................ 156/89.12; 156/62.2; 156/89.16; 156/89.21; 264/632; 264/642; 264/645; 264/670; 264/678; 264/328.2; 419/5; 419/37; 419/38; 360/99.08
[58] Field of Search .................... 264/63, 60, 67, 264/328.2, 645, 632, 642, 670, 678; 156/89, 62.2, 89.12, 89.16, 89.21; 419/5, 37, 38

[56] References Cited

U.S. PATENT DOCUMENTS

| | | | |
|---|---|---|---|
| 2,985,939 | 5/1961 | Brockmen | 156/89 |
| 3,984,873 | 10/1976 | Pecha . | |
| 4,535,374 | 8/1985 | Anderson et al. . | |
| 4,663,682 | 5/1987 | McNeil . | |
| 4,752,848 | 6/1988 | Garcia et al. . | |
| 4,783,297 | 11/1988 | Ito | 264/63 |
| 4,827,470 | 5/1989 | Odawara et al. | 369/271 X |
| 4,870,703 | 9/1989 | Augeri et al. . | |
| 4,933,785 | 6/1990 | Morehouse et al. . | |
| 5,027,241 | 6/1991 | Hatch et al. . | |
| 5,101,306 | 3/1992 | Johnson | 369/270 |
| 5,128,574 | 7/1992 | Koizumi et al. | 310/90 |
| 5,130,594 | 7/1992 | Taghezout et al. | 310/256 |
| 5,181,148 | 1/1993 | Blanchette et al. | 360/99.08 |
| 5,237,472 | 8/1993 | Morehouse et al. . | |
| 5,270,999 | 12/1993 | Chessman et al. | 369/271 |
| 5,289,325 | 2/1994 | Morehouse et al. . | |
| 5,406,158 | 4/1995 | Arnold | 310/692 |
| 5,412,522 | 5/1995 | Lockhart et al. | 360/99.08 |
| 5,424,887 | 6/1995 | Schuh | 360/99.08 |
| 5,434,730 | 7/1995 | Shishido | 360/99.08 |

OTHER PUBLICATIONS

"Prairie 120" PrairieTek Corporation Publication, ©1989.

*Primary Examiner*—James Derrington
*Attorney, Agent, or Firm*—Skjerven, Morrill, MacPherson, Franklin & Friel LLP; David W. Heid

[57] ABSTRACT

A disk drive is disclosed including a substantially monolithic stator. The stator is formed by a metal injected molding (MIM) process in which high silicon iron is sintered to produce a stator made from loss magnetic material. The low loss magnetic material is a low hysteresis loss, high resistivity material. A substantially monolithic stator without multiple laminations is thus achieved. Avoiding stator laminations in this manner permits the fabrication of a disk drive having a significantly reduced vertical profile while still suppressing undesired eddy current and hysteresis losses in the stator. The stator is advantageously directly machined with a central bore to receive a bearing assembly for the spindle of the hub of the drive motor. The disclosed stator geometry is optimized in three dimensions to minimize stator volume and maximize the stator winding volume.

4 Claims, 8 Drawing Sheets

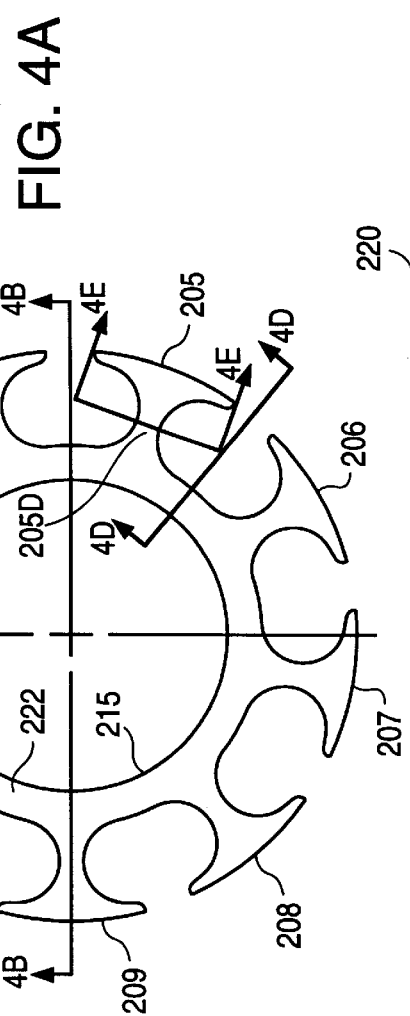
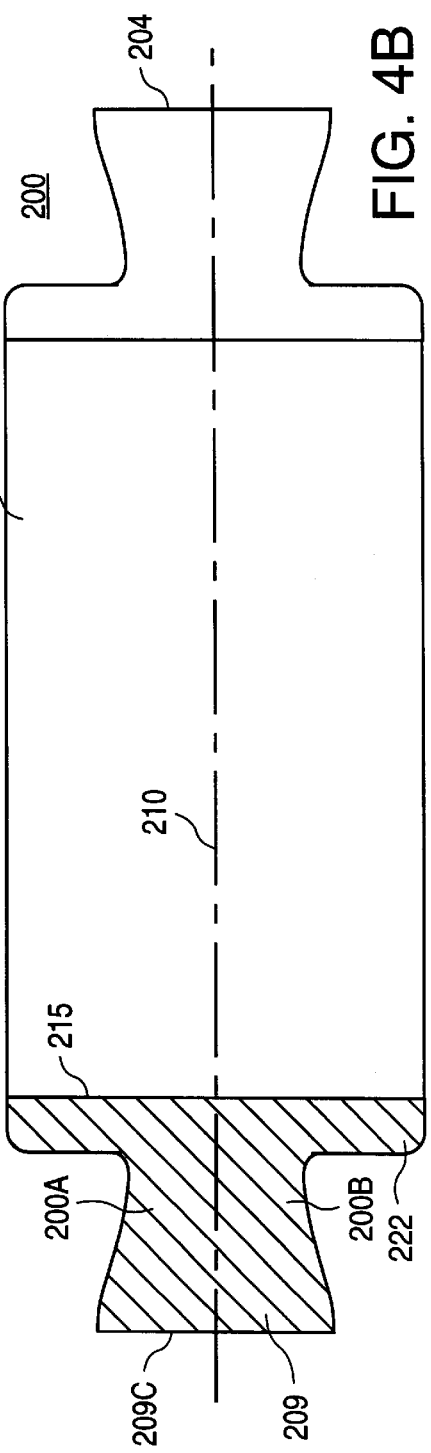
FIG. 4A
FIG. 4B

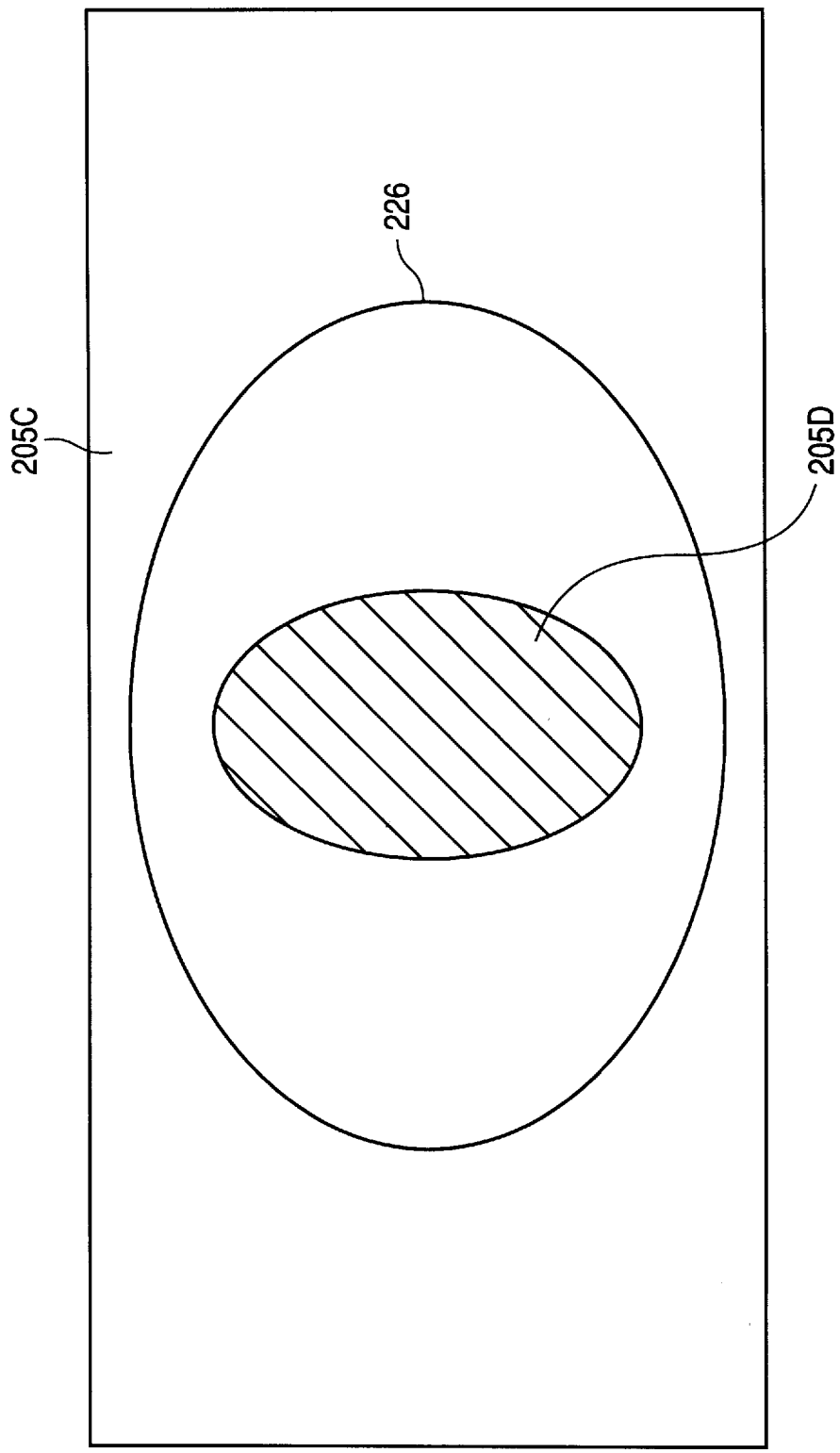

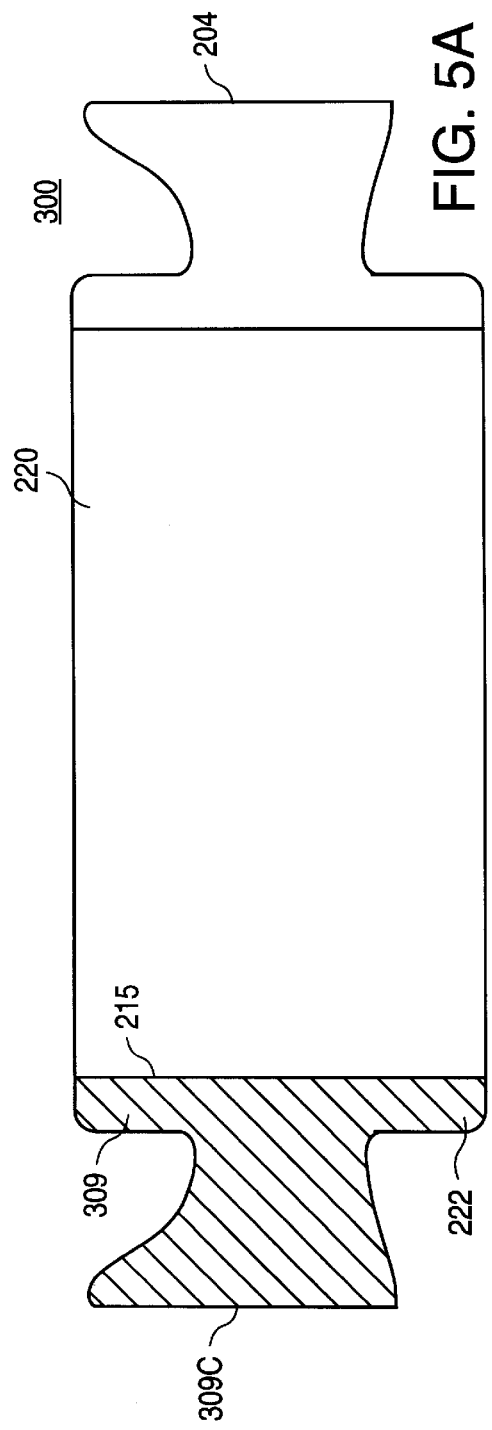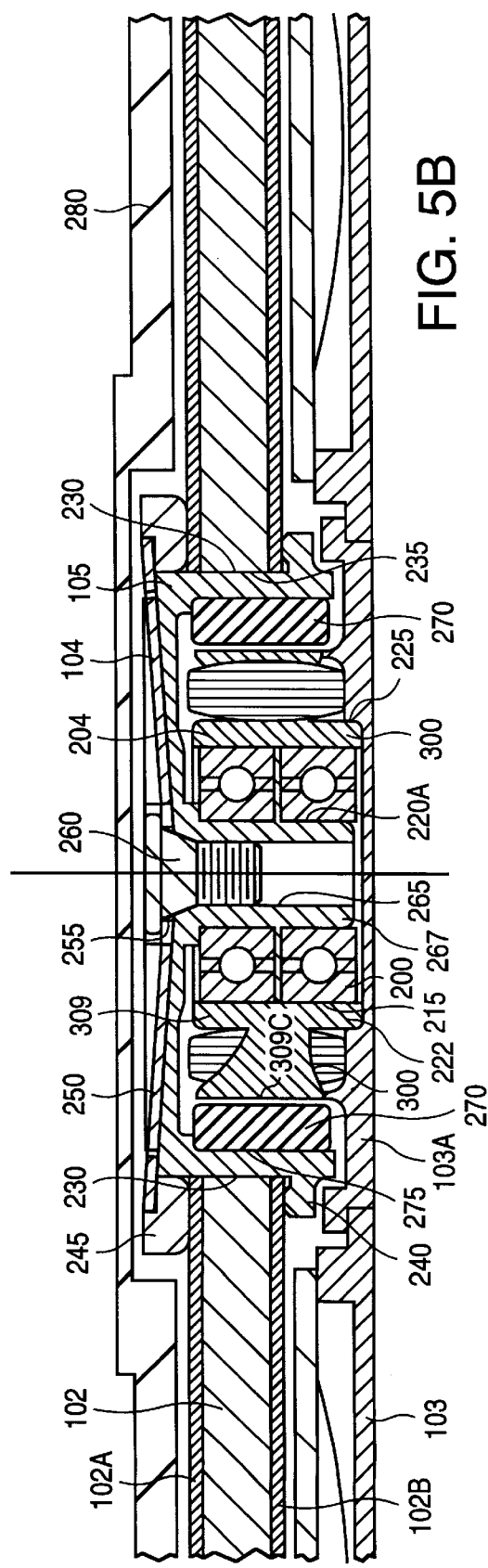

METHOD OF PRODUCING A STATOR FOR A DISK DRIVE MOTOR

CROSS REFERENCE TO RELATED PATENT APPLICATIONS

This application is a division of application Ser. No. 08/392,452, filed Feb. 22, 1995, now abandoned.

This patent application is also related to the copending patent application entitled "AIR BEARING SLIDER AND HEAD GIMBAL ASSEMBLY", (Attorney Docket No. M-2849) by Bruce Emo et al., Ser. No. 08/271,398, filed Jul. 6, 1994 and assigned to the same assignee, the disclosure thereof being incorporated herein by reference.

This patent application is related to the copending patent application entitled "DYNAMIC HEAD LOADING DISK DRIVE WITH SUPER-FINISHED DISK SURFACE", (Attorney Docket No. M-2960) by Bruce Emo et al., filed concurrently herewith and assigned to the same assignee, the disclosure thereof being incorporated herein by reference.

BACKGROUND OF THE INVENTION

1. Field of the Invention

This invention relates in general to magnetic storage devices and, more particularly, to disk drive devices which include structures for maximizing spindle motor wire winding volume, reducing the height of the spindle motor and disk drive device, optimizing magnetic flux density within the drive device, and reducing eddy current and hysteresis energy losses in the motor of the drive device.

2. Description of Related Art

Conventional disk drives generally use motors which employ laminated structures to reduce undesired eddy currents. If left unchecked, eddy current flow within the drive motor results in power loss and motor heating. However, this situation can be avoided by laminating motor structures such as the stator. More particularly, by fabricating the stator from a large number of layers or laminates of magnetic material such as silicon steel, eddy current flow is significantly reduced. Such silicon steel laminate materials are also referred to as "soft magnetics" materials.

The modern trend is toward more miniaturized disk drives such as thin profile PCMCIA (Personal Computer Memory Card International Association) disk drives, for example. Unfortunately, when motor thickness is reduced, the number of layers in the laminated stator is correspondingly reduced. When the thickness of the motor becomes so reduced that the number of layers is approximately 4 or less, the ability of the laminated stator to reduce eddy current flow is seriously diminished.

Another problem with using laminated magnetic layers in miniaturized disk drives is that the laminated magnetic layers tend to have very sharp edges which can penetrate the insulation of wire windings. This can result in short circuits and motor failure. One approach used to address this problem in the conventional laminated stator assembly is to treat the laminated stator assembly with a protective insulative coating to shield the windings from the sharp edges of the laminates or layers of the stator.

Unfortunately, the use of laminated stator assemblies in disk drive motors causes yet another problem in that such laminated structures are generally not mechanically precise and therefore can not be used to accurately mount bearings. This necessitates a separate spindle bearing support structure which reduces the volume available for magnetic material and stator windings. The cost of the disk drive is correspondingly increased.

Another unfortunate problem which occurs when using conventional laminated stator assemblies in disk drive motors is that the laminates of such stator assemblies are essentially identical so that any given vertical or radial cross section of the stator is uniform in dimension from bottom to top. This results in uneven flux distribution within the stator assembly.

An example of a disk drive using a conventional laminated stator is shown in cross section in FIG. 1 as disk drive 10. Disk drive 10 is an "in-hub" design in which the motor is formed within the hub of the disk. More particularly, disk drive 10 includes a base plate 15 which serves as a base for the components which form the disk drive. A disk 20 is mechanically coupled to a hub 25. Hub 25 includes a central spindle 27 which is rotatably supported by a bearing 30 between spindle 27 and base plate 15. Bearing 30 is situated within a bore 32 which is machined in base plate 15 as shown in FIG. 1. A laminated stator 35 includes a stator winding 40 which interacts with magnets 45 to provide spinning force or torque to hub 25 and disk 20 when the stator windings are excited with electricity.

Laminated stator 35 is a substantially flat structure. As such, stator does not capture all of the flux produced by an adjacent magnet 45. As shown in FIG. 1, the flat geometry of stator 35 spans substantially less than the full face of magnet 35.

A disk clamp ring 50 is situated at the inner periphery of disk 20 so that the inner periphery of disk 20 is sandwiched between disk clamp ring 50 and hub 25. A clamp spring washer 55 including a central opening 60 is situated atop disk clamp ring 50. A clamp screw 65 passes through opening 60 and into hub 25. Clamp screw 65 compresses clamp spring washer 55 to hold disk 20 between clamp ring 50 and hub 25.

SUMMARY OF THE INVENTION

One advantage of the disk drive of the present invention is that the bearing structure of the drive is situated directly within the stator itself thus avoiding any intermediate volume consuming structures. Another advantage of the disk drive of the present invention is a reduction in hysteresis and eddy current losses in the stator without using laminated stator structures. Yet another advantage of the disk drive of the present invention is a geometry that increases the amount of stator material which is situated in the flux path of the magnets of the drive motor. Another advantage of the disk drive of the invention is the control of flux density within the stator through the three dimensional geometry selected for the stator. Still another advantage of the disk drive of the present invention is an increase in the amount of vertical and horizontal room available for stator windings. One more advantage of the disk drive of the invention is the elimination of sharp edges on the stator assembly which otherwise might cause shorted stator windings. Still another advantage of the disk drive of the invention is a stator assembly including a precision machined internal cylindrical bore in which spindle bearings are positioned. Yet another advantage of the disk drive of the present invention is easier disk drive fabrication.

In accordance with one embodiment of the present invention, a disk drive is provided which includes a rotor having a hub with a central spindle therein. A disk is fixedly mounted to the hub. The disk drive also includes a substantially monolithic stator of low loss magnetic material, the stator being situated substantially within the hub to drive the rotor. The stator includes a central bore therein. The disk drive further includes a bearing assembly situated directly in the central bore of the stator, the central spindle of the hub being rotatably mounted in the bearing assembly. The drive also includes an elongated arm and a magnetic read/write head situated on the elongated arm. The disk drive further includes an actuator for moving the arm and read/write head to flying positions above the disk.

Another embodiment of the disk drive includes a rotor having a hub with a circular inner peripheral surface on which a plurality of magnets are situated. The hub includes a central spindle. The drive further includes a disk which is fixedly mounted to the hub. The drive also includes a substantially monolithic stator of low hysteresis magnetic material, the stator being situated substantially within the hub to drive the rotor. The stator includes a center and a central bore precisely machined at the center of the stator. The stator further includes a plurality of poles, each pole having a rounded surface for receiving a stator winding thereon. The stator includes a plurality of stator windings respectively wound on the rounded surfaces of the poles. A bearing assembly is situated directly in the central bore of the stator and the central spindle of the hub is rotatably mounted in the bearing assembly to permit the rotor to spin about the stator. The disk drive also includes an elongated arm and a magnetic read/write head situated on the elongated arm. The drive further includes an actuator for moving the arm and read/write head to flying positions above the disk.

One embodiment of the disk drive employs a stator with substantially rounded surfaces. In another embodiment, the stator includes a plurality of spaced-apart pole faces which are joined by respective pole support members to a central stator ring. The pole support members exhibit a substantially oval cross section. The rounded corners of the stator and oval geometry provide a substantially smooth stator pole about which the stator winding is wound. Since each stator pole is smooth, the use of a protective coating on the stator poles to prevent shorting the stator windings on the sharp stator surfaces which are generally associated with laminated stators is avoided. Alternatively, such protective coatings are significantly reduced in thickness, further increasing the volume available for wire windings.

In another embodiment of the invention, the monolithic stator itself is machined with a central bore to receive a bearing assembly for the spindle of the hub of the drive.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 4A is a top plan view of the stator of the disk drive of FIG. 2

FIG. 4B is a cross-sectional view of the stator of FIG. 4A taken along section line 4B—4B.

FIG. 4E is a cross-sectional view of the stator of FIG. 4A taken along section line 4E—4E.

FIG. 5A is a cross-sectional view of another embodiment of the stator.

FIG. 5B is a cross-sectional view of a disk drive employing the stator of FIG. 5A.

DETAILED DESCRIPTION OF THE INVENTION

Figure 1:
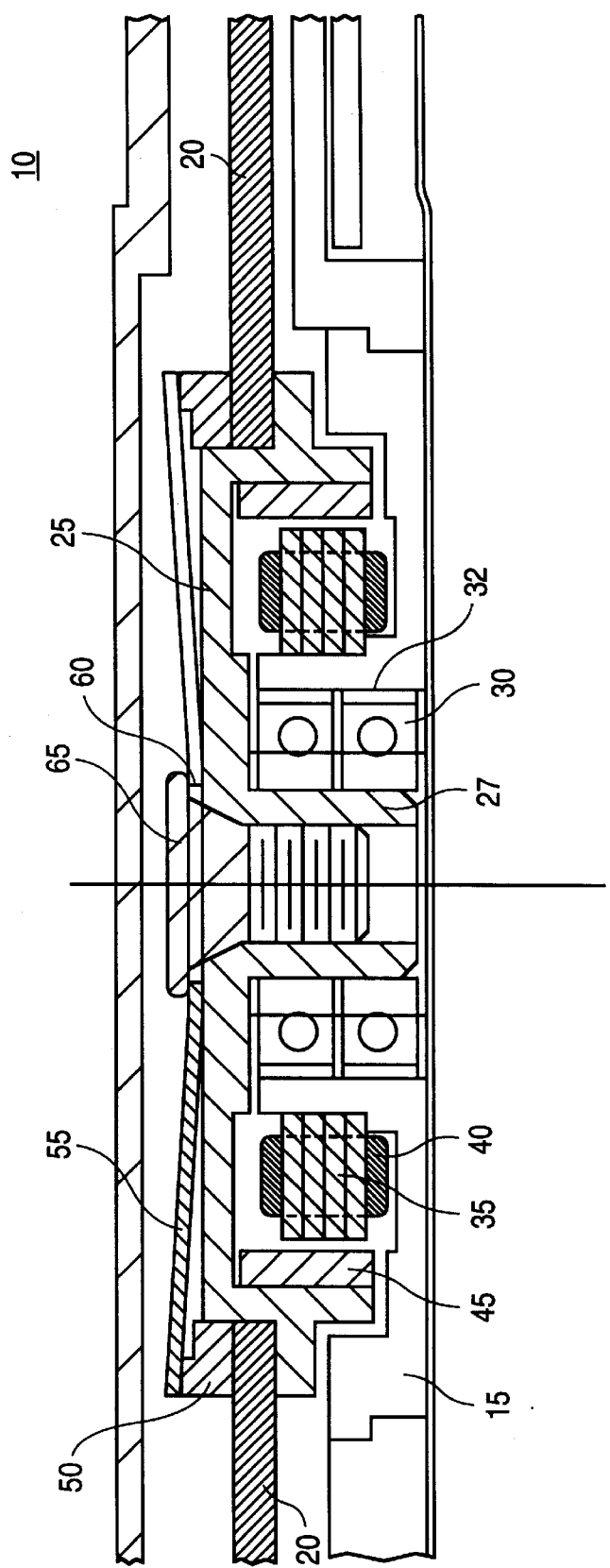
FIG. 1 is a cross-sectional view of a conventional disk drive.
Figure 2:
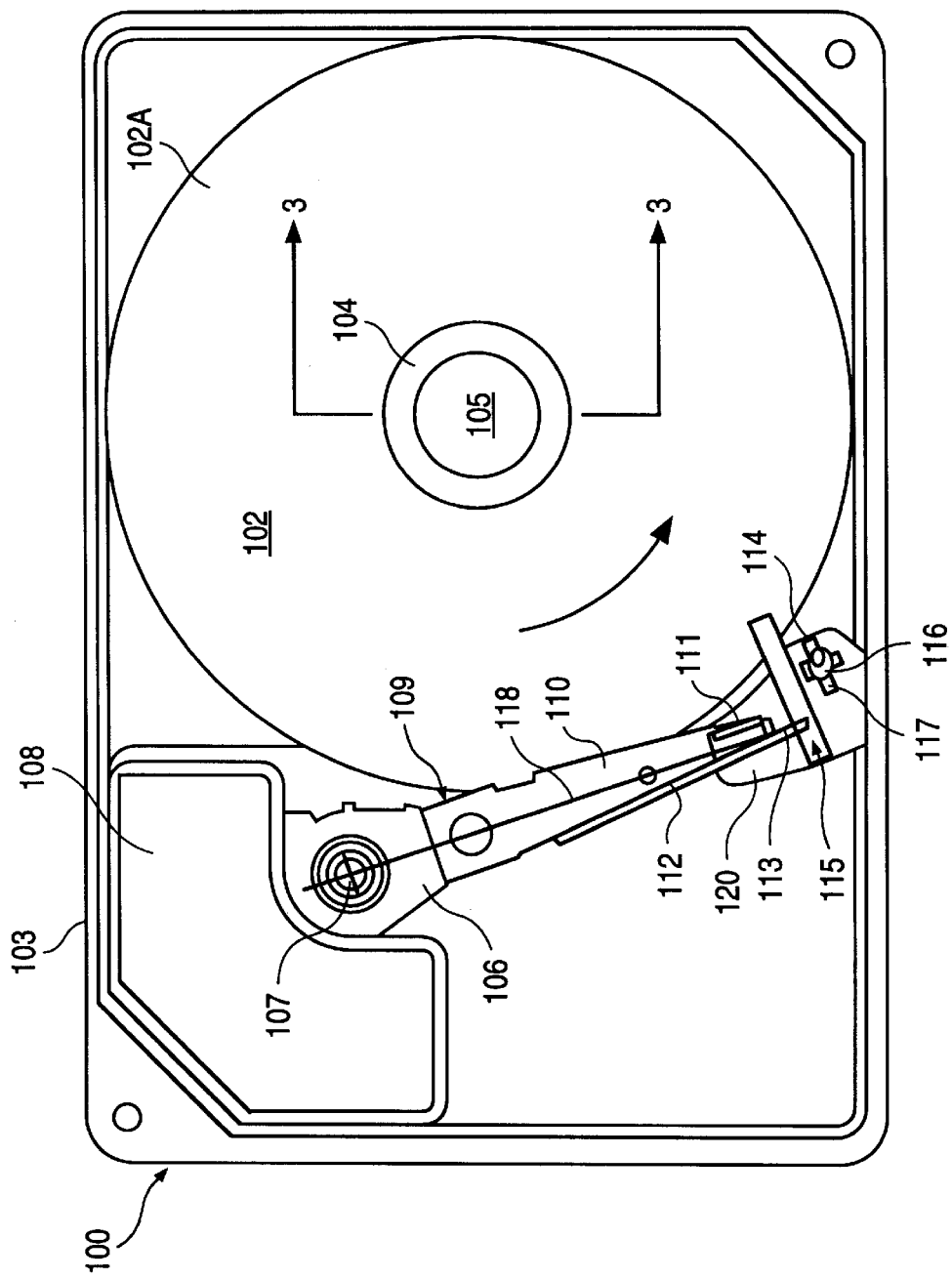
FIG. 2 is a top plan view of the disclosed disk drive including a stator fabricated from powdered metal material.

FIG. 2 shows a top plan view of one embodiment of a disk drive 100 which is highly enlarged for illustration purposes. Drive 100 includes a stator structure, described later in more detail, which reduces stator hysteresis and eddy current losses while permitting the drive to exhibit a relatively low vertical profile.

Disk drive 100 includes a rigid disk 102 having magnetic surface coatings 102A and 102B on the opposed surfaces thereof to permit recording and playback of digital information. Disk 102 is rotatably supported by a motor and spindle assembly shown in cross section in FIG. 3. While disk 102 is a rigid magnetic disk in this particular embodiment, it is also contemplated that other disks such as optical disks, magneto-optical disks and CD ROM's, for example, be used as disk 102. Returning to FIG. 2, a clamp 104 secures disk 102 to hub 105 of the motor to permit disk 102 to spin or rotate with the rotor portion of the motor.

Disk drive 100 includes a rotary actuator having an actuator body 106 which rotates about a center of rotation 107. A suitable coil and permanent magnet motor (not shown) are positioned beneath a return plate 108 to rotate the position of actuator body 106. Drive mechanisms other than a permanent magnet motor may be used as well to rotatably position actuator body 106.

A head gimbal assembly 109 or suspension is attached to actuator body 106 such that assembly 109 rotates about center of rotation 107. Head gimbal assembly 109 forms an elongated actuator arm which includes a generally flat, triangularly shaped load beam 110 which supports a slider body 111 near the free end of the load beam. Slider body 111 includes a read/write element or head for writing information to and reading information from magnetic recording disk 102.

To increase the storage capacity of the disk drive, a second head gimbal assembly may be optionally installed beneath disk 102 to provide for recording and playback of data on the lower surface of disk 102. To further increase the ultimate storage capacity of the disk drive, one or more disks and corresponding head gimbal assemblies may be stacked below the disk depicted in FIG. 2. Head gimbal assembly 109 includes a lift tab 112, such as a rod for example, which is suitably attached to the upper surface of load beam 110. Alternatively, lift tab 112 can be formed integrally with load beam 110.

A cam assembly 114 is supported on baseplate 103 such that cam assembly 114 is in operative relationship with the free end 113 of lift tab 112. Cam assembly 114 includes a cam surface 115. Load beam 110 of head gimbal assembly 109 provides a downward force (when viewed as illustrated in FIG. 2) which maintains free end 113 of lift tab 112 in contact with cam surface 115. As seen in FIG. 2, a portion of cam surface 115 extends over the upper surface of disk 102. Cam assembly 114 is attached to baseplate 103 by a suitable fastener such as a bolt 116 having a threaded end (not shown) which cooperates with a threaded opening (not shown) in baseplate 103. As seen in FIG. 2, cross-shaped slot 117 permits adjustment of the position of cam assembly 114 on baseplate 103.

Cam surface 115 cooperates with lift tab 112 of load beam 110 to provide the load beam and head element with a resting place laterally spaced apart from the disk when the drive is powered down. Cam surface 115 also provides a mechanism for lifting load beam 110 and the head element thereon to a flying position above disk 102 after the drive is powered up and disk 102 is spinning at operational speed. More detail with respect to this lifting mechanism is found in the cited patent application entitled "DYNAMIC HEAD LOADING DISK DRIVE WITH SUPER-FINISHED DISK SURFACER", (Attorney Docket No.M-2960) by Bruce Emo et al., the disclosure thereof being incorporated herein by reference, and in U.S. Pat. No. 5,289,325 entitled "RIGID DISK DRIVE WITH DYNAMIC HEAD LOADING APPARATUS", by James H. Morehouse et al., issued Feb. 22, 1994, the disclosure thereof being incorporated herein by reference, and in U.S. Pat. No. 5,237,472 entitled "RIGID DISK DRIVE WITH DYNAMIC HEAD LOADING APPARATUS", by James H. Morehouse et al., issued Aug. 17, 1993, the disclosure thereof being incorporated herein by reference. While the particular drive illustrated in the embodiment of FIG. 2 is a "dynamic head loading" type of disk drive, other types of disk drives such as "contact start stop" (CSS) disk drives can also be employed.

FIG. 4A is a top plan view of a stator 200 employed by disk drive 100. Stator 200 exhibits a substantially annular geometry. In this particular embodiment, stator 200 includes 9 poles although a greater or lesser number of poles may be used for the stator depending on the particular application. More particularly, stator 200 includes substantially identical pole structures 201–209 or legs which are uniformly spaced apart about the periphery of stator 200. Stator 200 is a non-laminated structure in that stator 200 is not composed of a series of stacked layers. Rather, stator 200 is a substantially monolithic structure which is formed as a single component in one embodiment.

A low loss magnetic material is used to fabricate stator 200. More particularly, a powdered magnetic material of the type referred to as a "soft magnetic material" is used as the source material for fabricating stator 200 in one particular embodiment. A metal injection molding (MIM) process, described later, can be used to form stator 200 from a soft magnetic material. Such a "soft magnetic material" exhibits low magnetic hysteresis characteristics when subjected to alternating magnetic fields. Thus, stator 200 which is fabricated from such low hysteresis magnetic material reduces hysteresis energy losses. Low hysteresis loss magnetic materials are those magnetic materials exhibiting a hysteresis loop with minimized area. With such low hysteresis magnetic materials, the hysteresis losses are less than approximately 3500 ergs/cm$^3$. Furthermore, the magnetic material also exhibits high resistivity to reduce eddy current losses. The resistivity of the magnetic material is typically within the range of approximately 30 $\mu\Omega$-cm to approximately 80 $\mu\Omega$-cm.

Thus, the low loss magnetic material selected for fabrication of stator 200 exhibits both low hysteresis loss and high resistivity. A powdered metal magnetic material such as silicon iron is used as the magnetic material for fabrication of stator 200. Alternatively, a powdered nonmetal magnetic material such as ceramic ferrite is used as the magnetic material.

One specific example of a low loss magnetic material which can be used to fabricate stator 200 is a high silicon iron magnetic material such as Ames Part No. SAF-Si3-76 available from Ames of Barcelona, Spain. This particular powdered metal magnetic material is a silicon iron (Si—Fe) compound which is formed from approximately 96% pure iron (Fe), approximately 2.5% to approximately 3.5% silicon (Si) and approximately 0.3% to approximately 0,6% phosphorus (P). The magnetic properties of this magnetic material result in a finished stator with a coercivity of approximately 45 Oersted, a remanance of 1.3 Tesla (T), induction of approximately 1.4- to approximately 1.6 Tesla (T), and saturation of approximately 1.9 Tesla and maximum permeability of approximately 10800.

In one embodiment, a stator fabricated using this magnetic material and the later described MIM process will result in a finished stator which exhibits the follow physical properties. The physical properties of a stator fabricated from this magnetic material and the MIM process include a density of approximately 7.3 g/cm$^3$, a resistivity of approximately 57 $\mu\Omega$-cm, and a Curie temperature of approximately 750° C. The mechanical properties of this particular magnetic material include a tensile strength of 410N/mm$^2$, a yield strength of 280N/mm$^2$, an elongation of approximately 16%, and a Rockwell hardness of approximately 688. After this high silicon iron magnetic material is metal injection molded and sintered to form stator 200, the resultant stator exhibits a final density of approximately 98%.

An example of another low loss magnetic material which can be used to fabricate stator 200 is Carpenter Technology 76007650 or in general silicon iron alloys or powders with silicon content greater than approximately 3%.

Other low loss magnetic materials such as NiFe materials can also be used to fabricate stator 200. More particularly, NiFe materials which exhibit low hysteresis loss and high resistivity characteristics would be suitable for use as the magnetic material for stator 200. With such low loss NiFe magnetic materials, the hysteresis loss at saturation can be as low as approximately 200 erg/cm$^3$. For example, NiFe materials such as Ames SAF—Ni 50–80 and SAF—Ni 80–85 have high resistivity values in the range of 40–50 $\mu\Omega$-cm and low hysteresis loss. Ni content ranges between 40% and 85% with some molybdenum or manganese included in fractions of a percent up to approximately 5%.

A metal injection molding (MIM) process is used to form stator 200. More particularly, to fabricate stator 200, a mold is formed including a mold chamber in the shape of stator 200. The source material used in this particular MIM process is a metallic or nonmetallic magnetic powder material exhibiting the low hysteresis properties described earlier. The source material is mixed with a binder to hold the powdered metal together prior to injection molding. One binder material which can be used as the binder is a thermoplastic resin such as polyethylene or polypropylene. The mold is then injected with source material-binder.

The molded stator is then removed from the mold and heated in a reducing atmosphere to a temperature within the range of approximately 510 degrees C. to approximately 1320 degrees C. to remove the binder and sinter the powdered magnetic source material. In this manner, the powdered magnetic source material becomes a coherent mass of soft magnetic material without melting to form stator 200. Stator 200 is allowed to cool.

Metal injection molding (MIM), as described above, is an example of one way in which stator 200 can be fabricated. Other techniques such as forging and machining can also be used to fabricate stator 200.

As an alternative to forming stator 200 as a single molded part, stator 200 is formed as two symmetric halves 200A and 200B which are then joined together. It is noted that stator 200 is symmetric about center line 210 of FIG. 4B. The upper half 200A of stator 200 (the portion of stator 200 above center line 210) is formed in a mold having a mold chamber in the shape of the upper half of stator 200. An identical lower half 200B of stator 200 is then formed in the same or an identical mold. The symmetric upper and lower portions 200A and 200B of stator 200 are then joined together by adhesive at center line 210 to form a substantially monolithic stator 210.

As viewed in FIG. 4A, each of pole structures 201–209 exhibits a substantially dovetail-like shape. The edges of pole structures 201–209 are rounded such that the pole structures are substantially smooth and include no sharp edges which would penetrate the insulation on the stator windings or cause breakage of the stator windings. For example, rounded edges 201A and 201B of pole structure 201 are illustrative of the rounded edges of pole structures 201–209.

Figure 3:
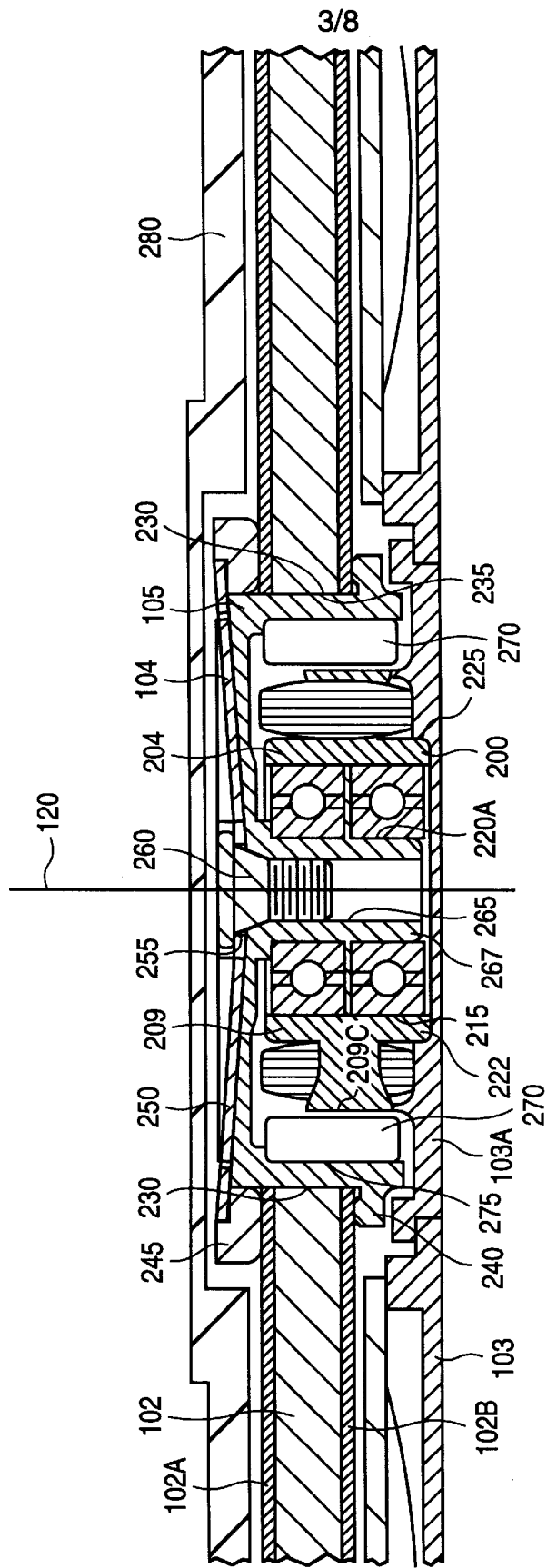
FIG. 3 is a cross-sectional view of the disk drive of FIG. 2 taken along section line 3—3.

A central bore 215 is situated in stator 200 as shown in FIGS. 4A and 4B. Central bore 215 is precision machined to receive a bearing assembly 220 which exhibits a substantially annular shape as shown in FIG. 3. It is noted that bearing assembly 220 is advantageously installed directly within stator 200 in bore 215 without the use of intervening structures in this embodiment. Bearing 220 includes a central race 220A which rotates or spins freely due to bearing action.

Each of pole structures 201–209 includes a pole face member which faces the magnets of the rotor. For example as shown in FIG. 4A, pole structure 201 includes a pole face member 201C having a convexly curved pole face 201C' which is illustrative of the pole faces. Stator 200 includes an inner ring 222 which is adjacent central bore 215. The pole face members of pole structures 201–209 are connected to the inner ring 222 of stator 200 by pole support members of which pole support member 201D and 205D are illustrative. These pole support members are generally normal to the pole faces of the respective poles and include a generally curved or rounded exterior. In one embodiment shown in FIG. 4A, pole support members 201D–209D (of which 201D and 205D are labelled) include a generally concave exterior (as viewed from above in this top plan view) which provides smooth surfaces on which the stator windings are wound. Each pole structure 201–209 thus includes a pole face member and a pole support member, the actual "magnetic pole" being located at the pole face of the pole face member.

Figure 4C:
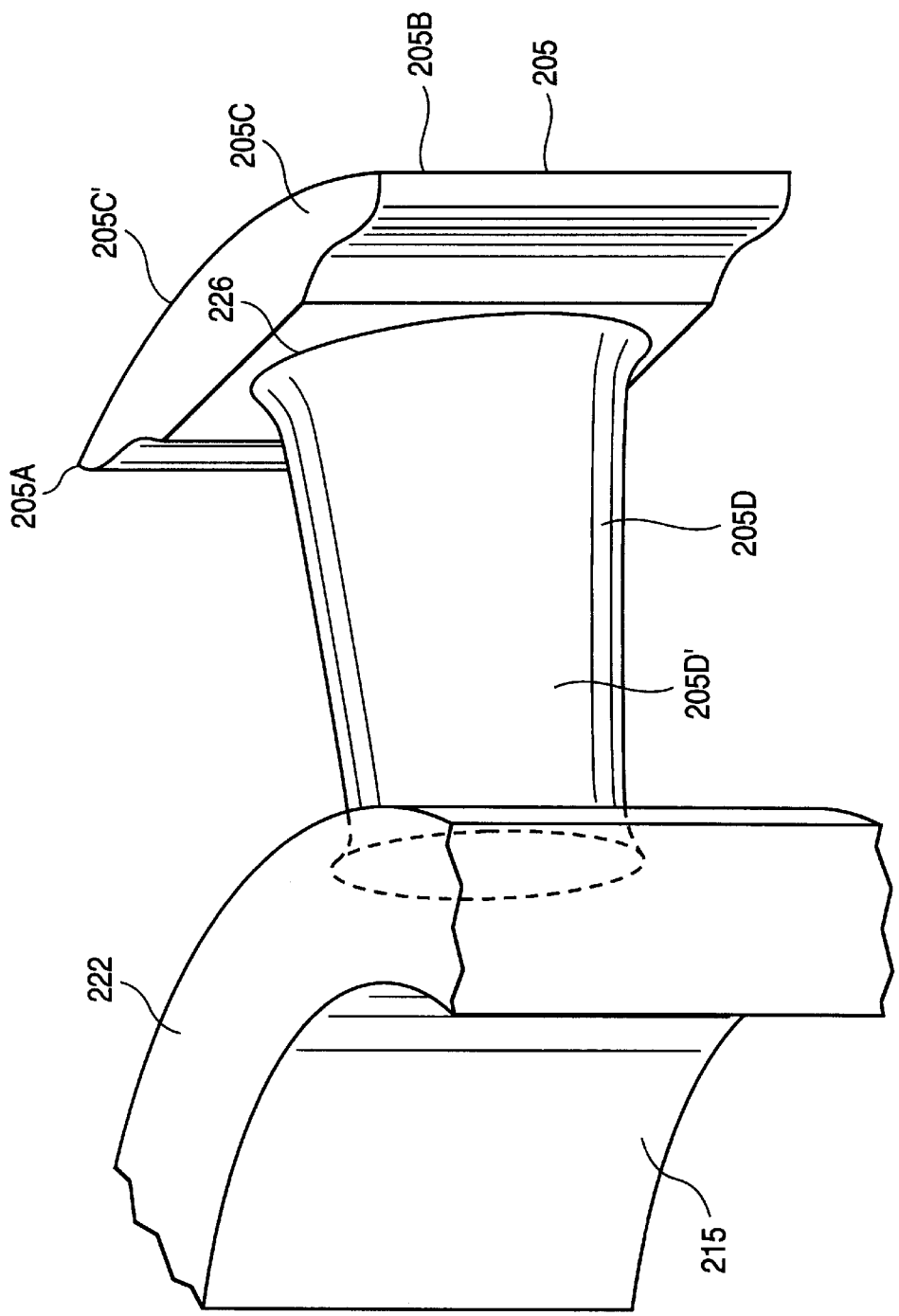
FIG. 4C is a perspective view of a cutaway portion of the stator of FIG. 4A.

FIG. 4C is a more detailed view showing a cutaway perspective of an illustrative pole 205 which is attached to inner ring 222. While the term "pole structure" is used to describe the leg-like structures 201–209, it should be understood that the actual "magnetic pole" associated with one of these pole structures is located at the pole face member of the pole structure, of which pole face member 201C is illustrative.

The geometry of pole support members 201–209 is controlled in three dimensions as now described. The substantially convex contour of illustrative pole face 205C' is readily observed in FIG. 4C. Pole face member 205C is joined to inner ring 222 by pole support member 205D which includes a generally curved or concave outer surface 205D'. It is noted that pole support member 205D is curved or flared where it meets inner ring 222 to help reduce breakage of the stator winding when it is wound on pole 205. In one embodiment, pole support member 205D is similarly curved or flared where it meets pole face member 205 at joinder line 226. The opposed ends 205A and 205B of pole face member 205C are rounded as shown in FIG. 4C to reduce the possibility of breakage of the stator winding or damage to the insulation of the stator winding.

While pole support members such as 201D and 205D are shown as being generally concave in the top plan view of FIG. 4A, namely with a changing slope between pole face member 205C and inner ring 222, it is noted that the central portions of pole support members 201D–209D exhibit a generally constant slope in the embodiment shown in FIG. 4C when viewed in this side perspective. In this particular embodiment, pole support members 201D–209D exhibit a generally oval or circular cross section with a diameter that generally decreases from the pole face member 205C to inner ring 222. It has been found that less stator material is needed for each pole structure as we proceed from the pole face to the center of the stator. The magnetic flux is most concentrated at the pole face and decreases radially inward toward the center of the stator. The disclosed pole support member geometry tapers in a generally cone-like manner from pole face member 205 to inner ring 222. By varying the geometry of the pole support members 201–209 in three dimensions in this manner, more volume or room is provided for the stator windings.

Figure 4D:
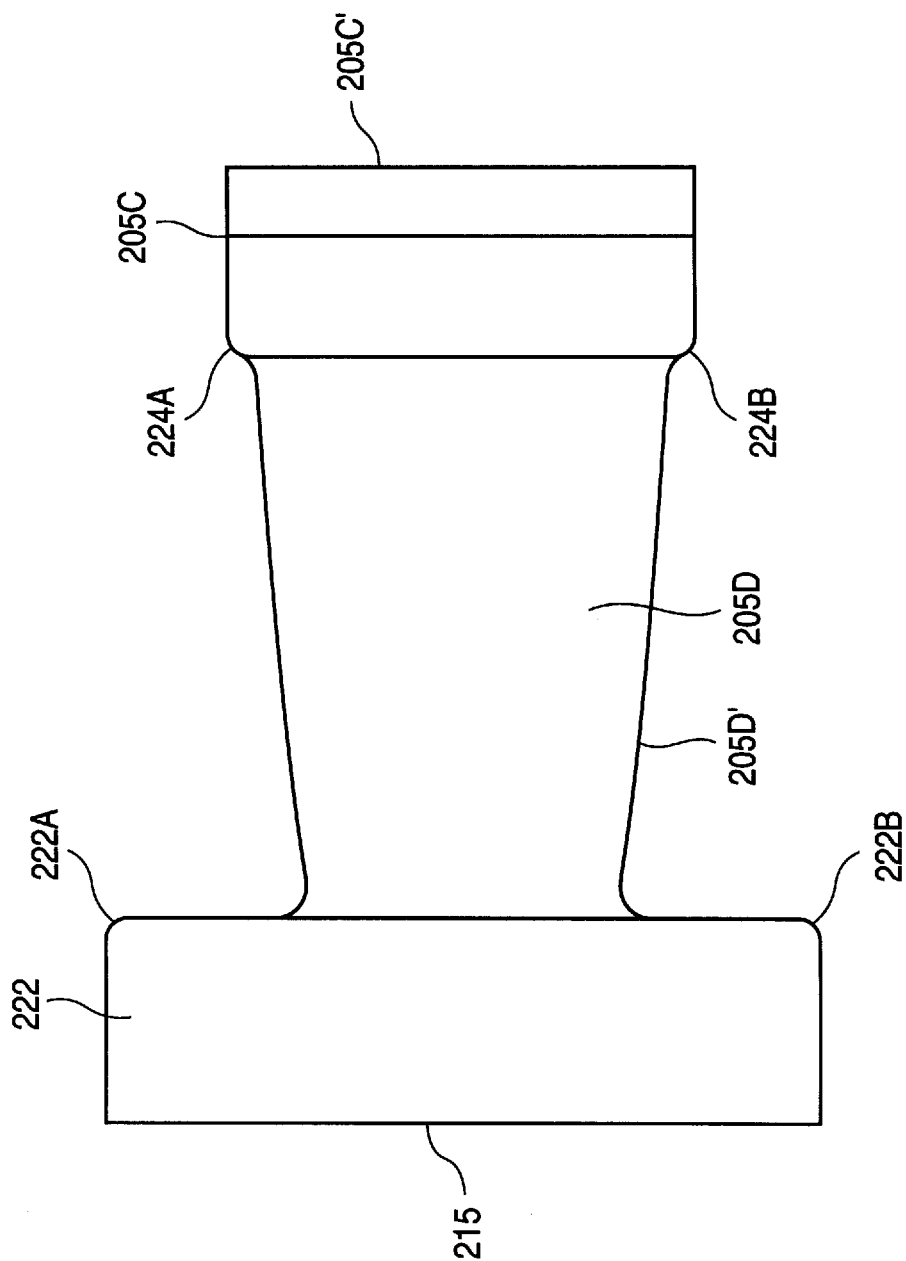
FIG. 4D is a cross-sectional view of the stator of FIG. 4A taken along section line 4D—4D.

FIG. 4D is a cross sectional view of stator 200 of FIG. 4A taken along section line 4D—4D. The outer upper edge 222A and the outer lower edge 222B are rounded to help reduce stator winding breakage or damage to the insulation on the stator winding. In FIG. 4D, pole support member 205D is shown as being curved or flared where it meets inner ring 222 and where it meets pole face member 205C. The inner upper edge 224A and inner lower edge 224B of pole face member 205C are also rounded to help reduce stator winding breakage or damage to the insulation on the stator winding. While one embodiment of stator 200 is described as including pole support members which exhibit a generally concave geometry as in the plan view of FIG. 4A, these pole support members can exhibit a more flattened outer surface as shown in the embodiment of FIG. 4D provided the pole support member and/or pole face member are curved or flared as described above to reduce stator winding breakage.

FIG. 4E is a cross sectional view of illustrative pole 205 of stator 200 of FIG. 4A taken along section line 4E—4E. In one embodiment, pole support member 205D is curved or flared where it meets pole face member 205C at joinder line 226. Other embodiments of stator 200 are less curved at joinder line 226 than indicated in FIG. 4E and 4C.

Returning now to FIG. 3, the mechanical layout of the motor assembly of disk drive 100 of FIG. 2 is illustrated in cross section. A center line 120 is included in FIG. 3 for reference. A central base member 103A is held in fixed position within base plate 103. Stator 200 is fixedly mounted within an annular recess 225 in central base member 103A. As discussed earlier, bearing 220 is directly situated within central bore 215 of stator 200.

Disk drive 100 includes a substantially circular hub 105 for supporting disk 102. Disk 102 includes an upper magnetic layer 102A, a lower magnetic layer 102B and a central opening 230 having in inner diameter of approximately 12 mm, in this particular embodiment. Hub 105 includes a circular outer surface 235 on which the inner diameter of central opening 230 of disk 102 rests. More specifically, the lower surface of disk 102 rests on a protruding ledge 240 of hub 105. Disk 102 is fixedly held to hub 105 by a disk clamp ring 245 adjacent disk central opening 230. The innermost portion of disk 102 is sandwiched between disk clamp ring 245 and protruding ledge 240. To hold disk 102 in position on hub 105, a clamp spring washer 250 is provided. Clamp spring washer 250 includes a central opening 255. A screw 260 is driven through opening 255 into a threaded central hole 265 in the central spindle 267 of hub 105 to compress clamp spring washer 250. In this manner, disk 102 is fixedly held to hub 105.

A plurality of permanent magnets or magnetized portions 270 are positioned in spaced apart relationship about the inner annular periphery 275 of hub 105. The rotor of drive 100 is formed by hub 105, magnets 270, disk 102, spring washer 250 and bearing 220 which all rotate together as a common assembly. In this particular embodiment wherein drive 100 includes 9 poles, it is noted that 12 permanent magnets 270 are employed although a greater or lesser number of poles and magnets may be employed in other embodiments if desired. The number of magnets 270 is equal to 4/3 the number of poles of the stator winding in this embodiment. A cover 280 is positioned over the drive assembly to protect the drive mechanism and to prevent contaminants from entering the mechanism.

While the particular disclosed disk drive 100 is of the "dynamic head loading" (DHL) type wherein the head is parked off the disk when the drive is powered down, the invention may also be practiced on other types of drives as well such as "contact stop-start" (CSS) drives wherein the head is parked on the disk when the drive is powered down.

In the embodiment of the drive depicted in FIG. 3 and 4B, it is noted that poles structures 201–209 of stator 200 flare outwardly toward magnets 270. Each of the pole faces of stator 200, of which pole face 209C is illustrative, extends across a portion of adjacent magnet 270 to intercept flux lines therefrom. FIG. 5A and 5B depict an embodiment of the stator of the drive as stator 300 which spans a substantial portion of the vertical height of the magnet 270 when the pole face passes the magnet. In this manner, more of the magnetic flux from magnets 270 is intercepted by the poles of the stator as the poles pass by magnets 270. In one embodiment, the vertical dimension of the pole face is approximately equal to the vertical dimension of the magnets 270. FIG. 5B is a cross section of the drive showing stator 300 situated within the disk drive. It is noted that in this particular embodiment, the vertical dimension of the pole face can range from approximately 50% to approximately 120% of the vertical dimension of the magnets.

It is noted that the disclosed stator construction technique permits the optimization of the stator geometry in all three dimensions thus allowing the largest possible volume to be allocated to stator windings. The surfaces of the molded stator which contact the stator windings are rounded. In this manner, the need for coating the stator with material to prevent cutting the insulative covering of the stator winding is eliminated. The incidences of short circuits of the stator windings to each other and to the stator are thus significantly reduced. The soft magnetic properties of the stator material itself reduce hysteresis losses and eddy currents in the stator. In this manner, laminations are advantageously avoided in the stator. In stators with very low vertical dimensions, the number of stator laminations can become very small and eddy currents can increase as the number of laminations decrease. However, the disclosed stator can exhibit a relatively low profile vertical dimension while still suppressing eddy current flow and maintaining low hysteresis loss. For example, it has been found that stators exhibiting a vertical dimension typically within the range of approximately 1.25 mm to approximately 1.5 mm or ever smaller can be produced. Of course, stators with a larger vertical dimension than this can be fabricated as well if desired for a particular application.

It is noted that the dimensions of stator 200 vary in all three dimensions, X, Y and Z as opposed to many conventional stators which typically exhibit dimensional variations in just the x and Y dimensions. Such limited two dimensional variation in conventional stators is generally due to the stamped fabrication process or stacked lamination process often used to fabricate conventional stators. The geometry in the disclosed stator embodiment permits improved distribution of the flux density within the stator. In the three dimensional profile of the disclosed stator, the geometry of the stator is selected to allow for the maximum flux density without magnetic saturation from the outer diameter of the stator to the inner diameter of the stator. In this manner, the minimum volume can be devoted to the soft magnetic material of the stator and the maximum volume can be devoted to the stator windings.

In the disclosed drive, the stator advantageously includes an integral bore for holding the bearings of the motor. The stator exhibits a single piece molded construction, or alternatively, a two piece symmetrical construction. In this manner, a very precise bore can be located in the stator itself. It is noted that laminated stators typically do not lend themselves to precision machining. By locating the bearing bore directly in the stator, a conventional bearing tower or base interstructure can be eliminated to allow even more room for stator windings. Advantageously, directly locating the bearing bore within the molded, substantially monolithic stator permits the motor to be completely built and tested prior to installing the motor in the baseplate. This feature represents a significant yield or cost factor when the motor and baseplate are completely integrated.

While a disk drive apparatus has been described above, it is clear that a method for fabricating the stator of a disk drive apparatus is also disclosed. Briefly, a method of fabricating a stator for a disk drive motor is disclosed which includes the steps of forming a mold in the shape of the stator to be fabricated and filling the mold with powdered magnetic material to form a molded stator. The method also includes the steps of removing the molded stator from the mold and heating the molded stator to a temperature within the range of approximately 510 degrees C. to approximately 1320 degrees C. to form a substantially monolithic sintered stator.

The foregoing has described a disk drive apparatus which advantageously reduces eddy current flow and hysteresis losses in the stator without resorting to laminated stator structures. The disclosed disk drive desirably eliminates sharp edges on the stator assembly which otherwise might cause shorted stator windings. The three dimensional geometry of the pole support members of the stator is shaped to increase the volume available for stator windings. Moreover, the disclosed disk drive also includes a precision machined central bore in which spindle bearings are directly situated without resorting to additional intermediate structures between the stator and the bearing.

While only certain preferred features of the invention have been shown by way of illustration, many modifications and changes will occur. It is, therefore, to be understood that the present claims are intended to cover all such modifications and changes which fall within the true spirit of the invention.

What is claimed is:

1. A method of fabricating a stator for a disk drive motor comprising the steps of:

providing a mold in the shape of a first half of a stator;

filling the mold with a low loss magnetic material to form a molded first stator half;

removing the molded first stator half from the mold;

heating the molded first stator half to a temperature within the range of 510 degrees C. to approximately 1320 degrees C. to form a sintered molded first stator half;

filling the mold with a low loss magnetic material to form a molded second stator half;

removing the molded second stator half from the mold;

heating the molded second stator half to a temperature within the range of approximately 510 degrees C. to approximately 1320 degrees C. to form a sintered molded second stator half, said second stator half having a shape identical with and symmetrical to said first stator half; and joining the sintered first stator half with the sintered second stator half to provide a substantially monolithic stator, said monolithic stator comprising a plurality of pole pieces, said pole pieces being rounded and smooth to eliminate sharp edges.

2. The method of claim 1 further comprising the step of:

machining a central bore directly in the substantially monolithic stator.

3. The method of claim 1 further comprising the step of combining the powdered magnetic material with a binder before the first filling the mold step.

4. A method of fabricating a stator as in claim 1 wherein said filling steps comprise metal injection molding, and the monolithic sintered stator having an induction of at least about 1.4 Tesla.

* * * * *